United States Patent [19]
Matsumura et al.

[11] 4,374,612
[45] Feb. 22, 1983

[54] MARK INDICATING DEVICE FOR OPTICAL APPARATUS

[75] Inventors: Susumu Matsumura, Kawasaki; Takashi Suzuki, Yokohama, both of Japan

[73] Assignee: Canon Kabushiki Kaisha, Tokyo, Japan

[21] Appl. No.: 283,014

[22] Filed: Jul. 13, 1981

[30] Foreign Application Priority Data

Jul. 25, 1980 [JP] Japan ................................. 55-102587
Apr. 3, 1981 [JP] Japan ................................... 56-50751

[51] Int. Cl.³ ...................... G03B 17/20; G03B 13/02
[52] U.S. Cl. ........................................ 354/53; 354/289
[58] Field of Search .............. 354/219, 53, 289, 200, 354/225; 350/3.85

[56] References Cited

U.S. PATENT DOCUMENTS

| | | | |
|---|---|---|---|
| 3,560,921 | 2/1971 | Lopez | 340/52 |
| 3,633,988 | 1/1972 | Farrar | 350/3.5 |
| 4,165,930 | 8/1979 | Matsumoto et al. | 354/53 |
| 4,200,380 | 4/1980 | Sato et al. | 354/219 |
| 4,255,032 | 3/1981 | Matsumoto et al. | 354/53 |
| 4,294,529 | 10/1981 | Sato et al. | 354/53 |

*Primary Examiner*—Donald A. Griffin
*Attorney, Agent, or Firm*—Fitzpatrick, Cella, Harper & Scinto

[57] ABSTRACT

An optical apparatus includes a transparent body arranged in an optical path of the optical apparatus and incorporating a relief hologram completely embedded therein and recording information of the mark, and an illuminator arranged outside the optical path to illuminate the hologram for providing a reconstructed image of the mark, the illumination being achieved in such a direction that the light passing through the hologram does not enter the optical path.

8 Claims, 11 Drawing Figures

MARK INDICATING DEVICE FOR OPTICAL APPARATUS

BACKGROUND OF THE INVENTION

1. Field of the Invention

The present invention relates to a device for indicating a mark in an optical system such as view-finder of a camera, and more particularly such device having relief hologram to form a reconstructed image of the hologram on an image plane of the optical system.

The term "hologram" herein shall mean any hologram capable of providing a reconstructed image when illuminated and shall include those prepared by holographic interference of light, by computer calculation or by diffraction lattice, or copies thereof and the like.

2. Description of the Prior Art

A holographic indicator similar to the present invention is already disclosed in the U.S. Pat. No. 3,633,988, in which a hologram is disposed at a sight window provided in a helmet for a pilot to enable him to observe a distant object simultaneously with an image reconstructed from the hologram at a distant position.

Also the U.S. Pat. No. 3,560,921 discloses a device which permits at the same time the observing of an instrument and an indicating mark reconstructed from a hologram.

The present invention is directed to a device capable of forming an image of the object and a reconstructed image of hologram on a substantially same plane for simultaneous observation through a single eyepiece.

Also in a camera, the view-finder is required to provide a clear view of the object. However, the presence of a hologram in the light path of the view-finder will darken or cloud the image of object observable therein, which is generally referred to as darkening phenomenon. The camera proposed by the present invention is featured in that the image of object is not affected by the hologram disposed in the light path of the view-finder when the indicating mark is not reconstructed therefrom, thereby allowing clear observation of the image of object without such darkening phenomenon.

The U.S. Pat. No. 4,165,930 of the present inventors discloses a holographic indicator utilizing a volume hologram to achieve the aforementioned objects. Also the U.S. Pat. No. 4,255,032, corresponding to the Japanese Patent Laid-Open Sho55-18664, of the present inventors discloses a holographic indicator utilizing a relief hologram which is cheaper in cost and more suitable for mass production than the volume hologram. However, in order that the image of object and the reconstructed mark can be satisfactorily observed in the view-finder in the use of said holographic indicator in a camera, the grating pitch of the relief hologram has to be made small to avoid the entry of undesirable diffracted light therefrom into the light path of the view-finder as already explained in the above-mentioned patent. The preparation of such relief hologram becomes more difficult as the grating pitch becomes smaller.

SUMMARY OF THE INVENTION

The object of the present invention is to provide a device allowing easy preparation and also allowing overlapping observation of a mark image obtained by illuminating a hologram and an image of an object obtained through an objective lens means.

Another object of the present invention is to provide a device having a hologram positioned in the optical path of objective lens means, wherein said hologram, when not illuminated by a light source, does not substantially affect the clarity of the image of object and provides, when illuminated, a mark image in overlapping manner with the image of object.

DESCRIPTION OF THE PREFERRED EMBODIMENTS

Figure 1:
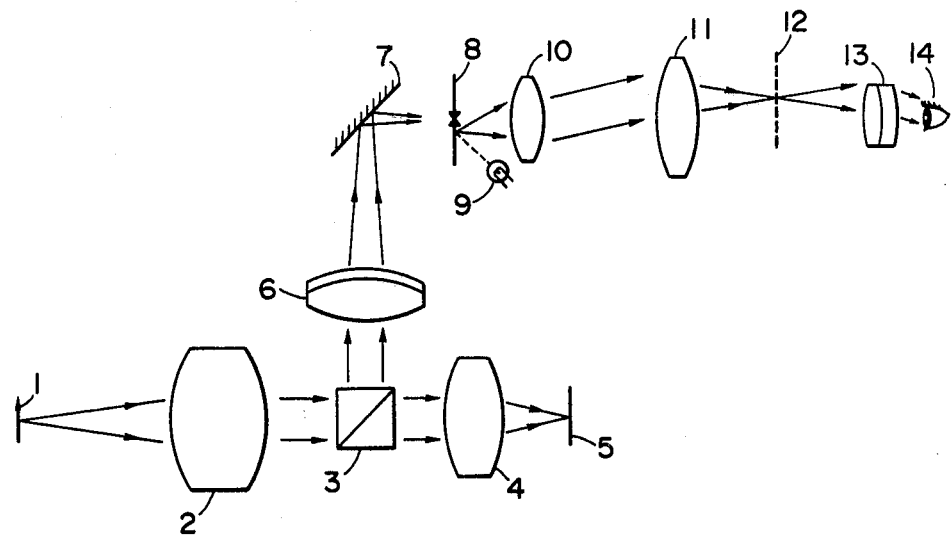
FIG. 1 is a cross-sectional view of an 8-mm movie camera incoporating a reflective mark indicating device.

FIG. 1 shows, in a cross-sectional view, an 8-mm movie camera incorporating a mark indicating device of the present invention, in which there are shown an object point 1; a picture-taking front lens group 2; a half-mirror 3; a picture-taking rear lens group 4; a photographic film plane 5; an imaging lens 6; a mirror 7; a focus plate 8 having a special focused relief image hologram provided with a display pattern therein; a white light source 9 for illuminating said hologram; finder relay lenses 10, 11; a secondary focus plane 12; and an eyepiece 13. The light beam from the object point 1 is focused on the focus plate 8 to form an image of the object thereon through said image-taking front lens group 2, half-mirror 3 and imaging lens 6. Also the special relief focused image hologram on the focus plate illuminated by the white light source 9 reconstruct an information mark in the vicinity of the focusing plate, whereby said object and the information mark can be viewed with a substantially same diopter through the relay lenses and the eyepiece.

Figures 2, 3:
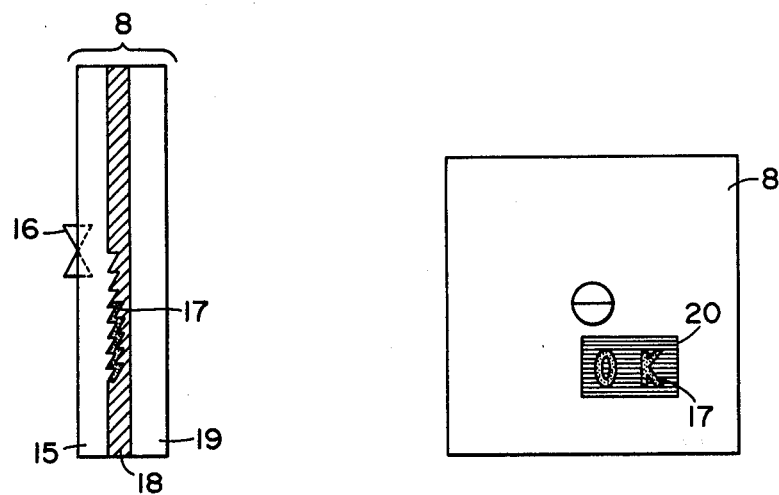
FIG. 2 is a cross-sectional view of the mark indicating device.
FIG. 3 is a plan view thereof.

The special relief focused image hologram to be employed in the present embodiment has a cross-sectional structure as shown in FIG. 2, which is basically same as that of the beam-splitter disclosed in the Japanese Patent Application Sho55-10190 of the present applicant, corresponding to the U.S. patent application Ser. No. 114,201, now abandoned, from which U.S. patent application Ser. No. 285,921, still pending, is a continuation. A dielectric reflective layer 17 of a certain design reflectivity is deposited by evaporation onto a relief diffraction lattice formed on a focusing plate 15 having split-image range-finder elements 16, and the structure of said relief diffraction lattice is embedded in a transparent cement 18 of a refractive index substantially same as that of the material constituting the focusing plate. A transparent covering member 19 is provided thereon.

The information pattern recording in the present information is achieved by depositing the reflective layer 17 corresponding to a pattern "OK" on the relief diffraction lattice 20 as shown in FIG. 3. Such deposition can be obtained by placing an appropriate mask, having apertures corresponding to the pattern "OK" on said diffraction lattice during the evaporation of the reflective layer.

The structure shown in FIG. 2 allows to substantially eliminate the undesirable effect of the relief diffraction lattice to the light beam in the finder as described in the aforementioned Japanese Patent Application Sho54-10190. More specifically the light beam passing through the relief diffraction lattice not provided with the reflective layer is scarcely affected by the relief structure if the refractive index of the transparent cement 18 is well matched with that of the focusing plate 15, thus providing a clear image in the finder. On the other hand, the light beam passing through the patterned area having the reflective layer of the hologram is decreased corresponding to the reflectivity thereof, thus providing a darker image in said patterned area, but such light loss is practically negligible if the reflectivity is maintained for example as low as ca. 4%.

Figure 4:
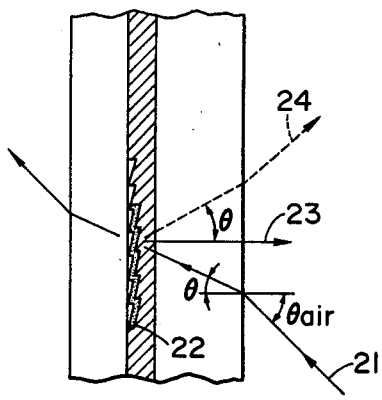
FIG. 4 is a magnified partial cross-sectional view thereof.

On the other hand the illuminating light beam 21 from a reconstructing light source shown in FIG. 4 is reflected and diffracted by the pattern provided with the reflective layer 22 to generate diffracted light 23 to reconstruct the information mark. 24 indicates the O-th order diffracted light. By so designing the relief diffraction lattice that the N-th order diffraction light (N≧2) is principally directed to the optical system of the finder, it is rendered possible to utilize a lattice of a pitch N-times larger than the case of utilizing the first-order diffracted light, thus facilitating the manufacture. Particularly preferred is a diffraction lattice blazed to N-th order in consideration of the efficiency of light utilization.

In consideration of a fact that the N-th order diffraction efficiency $\eta_{R(N)}$ can be approximately represented by:

$$\eta_{R(N)} = R \times \sin c^2(N\pi - \beta)$$

as shown by the equations (4) and (5) in the Japanese Patent Application Sho54-10190, the condition for N-th order blazing of the relief diffraction lattice can be represented by:

$$\beta = N\pi \tag{1}$$

wherein:

$$\beta = 2\pi \cdot n \cdot \Delta/\lambda \tag{2}$$

in which n stands for the refractive index of the material constituting the relief diffraction lattice, and $\Delta$ stands for the height of the relief structure.

Also for achieving reflective diffraction of the N-th order diffracted light into the direction of the optical axis, the diffraction angle $\theta$ in the material of a refractive index n has to satisfy the following condition:

$$P \cdot \sin \theta = N\lambda/n \tag{3}$$

wherein P stands for the lattice pitch.

Thus, from the foregoing conditions (1), (2) and (3) there can be obtained a condition:

$$\Delta/P = \frac{N\lambda}{2n} \cdot \frac{n \sin\theta}{N\lambda} = \tfrac{1}{2} \sin\theta$$

wherein $\theta$ is the incident angle of the illuminating light in the relief member. Consequently a relief diffraction lattice having a face of such inclination is desirable for the hologram for use in the device of the present invention.

Figure 5:
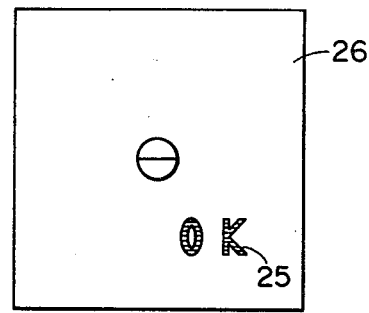
FIG. 5 is a plan view of the device having relief diffraction lattice in the pattern area along thereof.

FIG. 5 shows a second embodiment of the present invention, in which, in contrast to the embodiment shown in FIG. 3, the hologram is present only in the area 25 of relief diffraction lattice corresponding to the pattern information to be reconstructed, and the transparent plate constituting the focusing plate 26 is provided with the reflective layer on the entire face having the relief diffraction lattice. The cross-sectional structure of other components in this embodiment is similar to that shown in FIG. 2. Also in the present embodiment the information pattern is reconstructed by the reconstructing light source from the relief diffraction lattice in the similar manner as shown in FIG. 4.

However the effect on the transmitted light is somewhat different from that in the first embodiment. As the reflective coating in this case is provided on the entire internal face of the focusing plate 26, the area of information pattern alone does not appear darker though the entire viewing field becomes slightly darker.

In the foregoing embodiments the reconstructing light source is positioned closer to the eye than the relief diffraction lattice, or, stated otherwise, the illuminating light source and the observer are positioned at the same side, but it is often desirable to employ the transmission type arrangement in which the illuminating light source is positioned at the opposite side of the observer as shown in FIG. 1, in consideration of the spatial limitation in the assembly into the camera finder or of the efficiency of light utilization.

Figure 6:
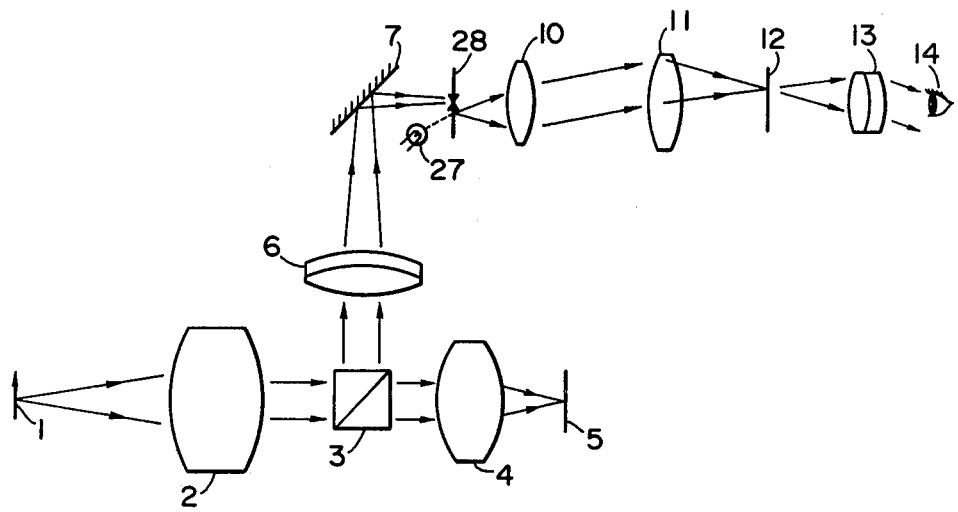
FIG. 6 is a cross-sectional view of a movie camera incorporating a transmission mark indicating device.
Figure 7:
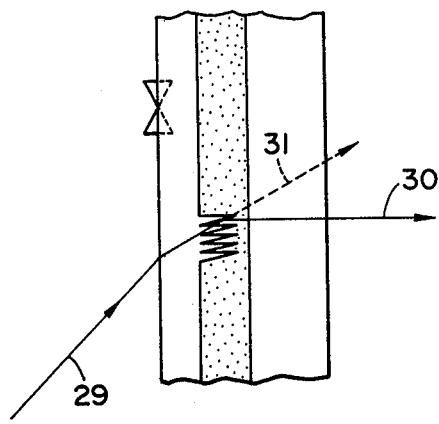
FIG. 7 is a magnified partial cross-sectional view of the device shown in FIG. 6.

FIG. 6 shows, in a cross-sectional view, an 8-mm movie camera utilizing a transmission type indicating device, of which the arrangement is same as that shown in FIG. 1 except the internal structure of the focusing plate 28 having a relief hologram and the position of the light source 27. FIG. 7 shows, in a partial cross-sectional view, an example of the hologram applicable in the present embodiment, which requires a relief structure with sharp peaks in order to direct the N-th order diffracted light 30 to the direction of optical axis.

Figure 8:
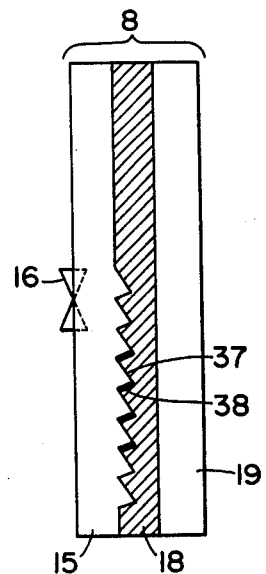
FIGS. 8 and 9 are cross-sectional views of the transmission type device with a larger lattice pitch.

Also FIG. 8 shows an example of the hologram applicable in the transmission type device as explained above and still not requiring a relief structure with sharp peaks. The relief diffraction lattice employed in said hologram is composed of unit lattice structures each having two faces 37, 38 inclined to the lattice surface substantially coinciding with the focal plane, wherein a dielectric reflective layer of a determined reflectivity is deposited on the face 38 angled more steeply to the lattice surface, and the above-mentioned lattice structure is embedded in a transparent cement 18 of a refractive index same as that of the material constituting the focusing plate. On said cement there is provided a transparent covering member 19.

The information pattern recording in the present embodiment is achieved, in a similar manner as shown in FIG. 3, by depositing the reflective layer on the more steeply inclined one of two faces constituting the unit lattice structure, corresponding to a pattern "OK". Such deposition can be achieved by placing an appropriate mask having apertures corresponding to said pattern "OK" on the relief diffraction lattice and conducting evaporation process toward said face of the lattice structure through said apertures.

Figure 9:
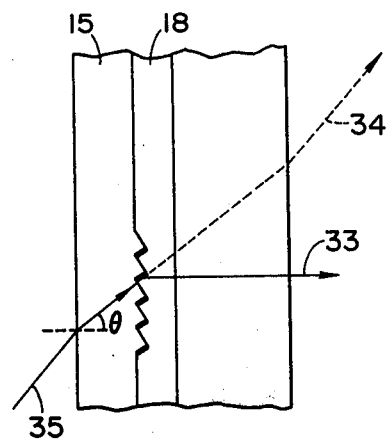

As shown in FIG. 9, the light beam 35 from the reconstructing light source is diffracted by said hologram to reconstruct the information mark by the diffracted light 33. The O-th diffracted light is indicated by 34. Said diffraction is shown in further detail in FIG. 10.

Figure 10:
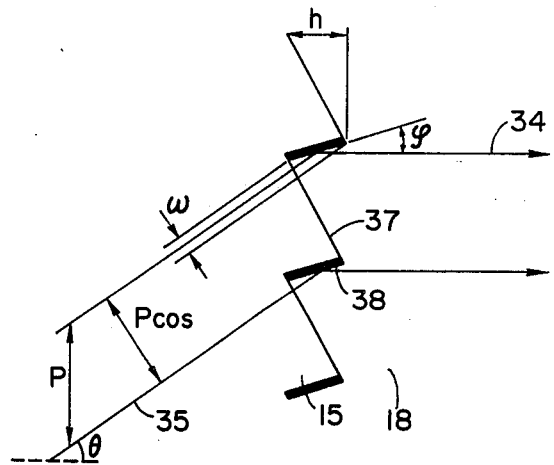
FIG. 10 is a magnified cross-sectional view showing the diffractive function of said device.

As shown in FIG. 10, the illuminating light 35 passes through the face 37 less steeply inclined to the lattice surface and reflected by the face 38 more steeply inclined and provided with the reflective layer, thus causing diffraction and forwarding the N-th order diffracted light 34 toward the observer. In the present embodiment the pitch P of the relief diffraction lattice is defined by:

$$P \sin \theta = N\lambda \tag{4}$$

wherein $\lambda$ is the wave length of the light in the material constituting the diffraction lattice, and $\theta$ is the incident angle of the incident light as shown in FIGS. 9 and 10. Also the efficiency of light utilization can be improved to obtain brighter display, by so arranging the face with reflective layer of the relief diffraction lattice that the reflected light therefrom in the sense of geometrical optics is principally directed to the finder optical system. This requirement is represented by the following condition:

$$\phi = \theta/2 \tag{5}$$

wherein $\phi$ is the angle of the face 38 with reflective layer to a line perpendicular to the lattice surface, as shown in FIG. 10. The height h of the lattice structure and the reflectivity of the deposited reflective layer can be approximately determined in the following manner, although more accurately the reflectivity should be determined from the product of the diffraction pattern of unit diffraction structure and the $\delta$-function showing the direction of diffracted light caused by the repeating diffraction structures. Now, let $R_{eff}$ be the effective reflectivity, or the ratio of the amount of light required for the display of the information mark in the incident light beam, and $R_\theta$ be the reflectivity of the deposited reflective layer for the illuminating light with an incident angle $\theta$ or an incident angle $\pi/2 - \theta$ to the reflecting face, then:

$$R_{eff} = R_\theta \cdot \frac{\omega}{P \cos\theta} \tag{6}$$

wherein $\omega$ is the width of incident light beam reaching the reflective face as shown in FIG. 10 and is represented by:

$$\omega = \frac{h \sin\theta}{\cos\phi} \tag{7}$$

From (6) and (7) there can be obtained:

$$R_\theta \cdot h = r_{eff} P \cos\phi \cot\theta \tag{8}$$

For example, for the following conditions:

$$\begin{aligned} \theta &= 27° \\ \lambda &= 0.4\mu \\ N &= 12 \\ R_{eff} &= 0.04 \end{aligned} \tag{9}$$

there can be obtained from the equations (5) to (8):

$$P = 10.6(\mu) \tag{10}$$
$$\phi = 13.5°$$
$$R_\theta h = 0.81(\mu) \tag{11}$$

Consequently the reflectivity of the deposited reflective face and the height of the lattice structure can be determined so as to satisfy the condition (11). The foregoing calculation employs the condition of the blazed diffraction lattice and assumes that all the diffracted light is included in the 12th-order diffracted light, but in practice the value of $R_{eff}$ should be calculated in consideration of the leak of light into the diffracted light of other orders.

Although the relief diffraction lattice in the foregoing embodiment is provided with the reflective layer only on one of two faces constituting the unit relief structure, said layer may also be deposited on both faces in order to facilitate the evaporation process. Such structure naturally results in a loss of light, but is practically acceptable as long as the reflectivity of the reflective layer is maintained sufficiently low. The device utilizing the hologram shown in FIGS. 8, 9 and 10, being designed to utilize the N-th order diffracted light for the reconstruction of the information mark as shown in the equation (4), allows the use of a large lattice pitch and has a certain freedom in the inclination of the other face constituting the lattice structure and in the height thereof as long as the condition (5) is satisfied, so that is it extremely advantageous in the preparation of the diffraction lattice.

Figure 11:
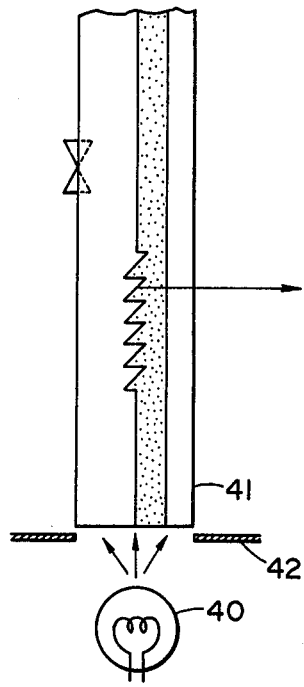
FIG. 11 is a cross-sectional view showing another embodiment of the device.

FIG. 11 shows still another embodiment, in which the light source 40 is positioned facing to a lateral edge of a transparent body 41 incorporating the relief hologram, and the light guided in said body by total reflection is diffracted by the reflective layer provided on the relief diffraction lattice to display the information pattern. A light shield member 42 is provided to intercept unnecessary light.

The pattern of the relief diffraction lattice of the hologram employed in the foregoing embodiments can be prepared, in a similar manner as in the preparation of ordinary Fresnel lenses or of diffraction lattices for spectrometry, by forming grooves on a metal with a diamond blade according to the required lattice pitch, and by mass producing plastic replicas for example by compression process from thus prepared metal mold.

Also the relief or blazed diffraction structure can be obtained by recording interference patterns on a photoresist followed by image development according to the ordinary holographic process. Plastic replicas can also be prepared in this case by evaporating a metal layer on said photoresist, preparing a nickel mold by electrocasting process, and molding a plastic material thereon.

The large-pitched relief diffraction lattice employable in the present invention provides little color by dispersion in the reconstructed image. For this reason, in the reconstruction for example of an alarm mark, it may be desirable to employ a colored filter in combination with the light source or to employ a colored light source such as a light-emitting diode.

Although the foregoing description has been limited to the application of the present invention in the information pattern display device for use in the 8-mm movie camera, the present invention is by no means limited to such application.

What we claim is:

1. In an optical apparatus having objective lens means for forming an image of an object, a device for indicating a mark and view-finder means for viewing said image of object and said mark, wherein said device comprises:
   a relief hologram comprising a plurality of semi-reflective oblique faces periodically arranged to form a diffraction lattice entirely embedded in a transparent body, said hologram being arranged in an optical path of said optical apparatus; and
   illuminating means arranged outside said optical path to illuminate said hologram for obtaining a reconstructed image of said mark in overlapping manner with said image of object.

2. In an optical apparatus having objective lens means for forming an image of an object, a device for indicating a mark, and view-finder means for viewing said image of the object and said mark, wherein said device comprises:
   a first optical transparent member having a relief hologram of said mark thereon;
   a semi-reflective layer disposed on said relief hologram to define a semi-reflective relief structure;
   second optical transparent member connected to said semi-reflective layer to completely cover said semi-reflective relief structure; and
   illuminating means located outside said optical path to illuminate said semi-reflective relief structure so that a reconstructed image of said mark is obtained.

3. A device according to the claim 2, wherein said illuminating means is positioned opposite to said view-finder means with respect to the face having said hologram.

4. A device according to the claim 3, wherein said face having said hologram is provided with a relief diffraction lattice structure composed of periodically repeating triangle-sectioned unit structures each formed by two oblique faces, whereby diffracted light formed by one of said oblique faces having larger oblique angle to said face having said hologram is introduced into the optical path of said view-finder means.

5. A device according to the claim 2, wherein said first optical transparent member and said second optical transparent member have substantially the same refractive indexes.

6. A device according to claim 5, wherein said reconstructed image is the nth-order diffraction image, n being a integer greater than 1.

7. The device according to the claim 5, wherein said relief hologram is focused image relief hologram.

8. A device according to the claim 5, wherein said mark is reconstructed in an overlapping manner with said image of the object.

* * * * *

UNITED STATES PATENT AND TRADEMARK OFFICE
CERTIFICATE OF CORRECTION

PATENT NO. : 4,374,612

DATED : February 22, 1983

INVENTOR(S) : SUSUMU MATSUMURA, ET AL.

It is certified that error appears in the above-identified patent and that said Letters Patent is hereby corrected as shown below:

Column 1, line 31, "of hologram" should read --of a hologram--.

Column 2, line 49, "reconstruct" should read --reconstructs--;

line 52, before "same" insert --the--;

line 56, after "basically" insert --the--;

line 67, after "substantially" insert --the--.

Column 3, line 14, "Sho54-" should read --Sho55- --;

line 38, after "to" insert --the--;

line 48, change "Sho54" to --Sho55--;

line 56, "n" should not be italicized;

line 66, "n" should not be italicized.

Column 4, line 24, change "the similar" to --a similar--.

Column 5, line 49, "$R_\phi$ be" should read --$R_\theta$ be--.

Column 6, lines 36-37, "is it" should be --it is--.

UNITED STATES PATENT AND TRADEMARK OFFICE
CERTIFICATE OF CORRECTION

PATENT NO. : 4,374,612
DATED : February 22, 1983
INVENTOR(S) : SUSUMU MATSUMURA, ET AL.

It is certified that error appears in the above-identified patent and that said Letters Patent is hereby corrected as shown below:

IN THE CLAIMS:

Column 7, line 11 (Claim 1, line 4), after "of" insert --the--;

line 21 (Claim 1, line 14), after "of" insert --the--.

Signed and Sealed this

Twenty-second Day of May 1984

[SEAL]

Attest:

GERALD J. MOSSINGHOFF

Attesting Officer

Commissioner of Patents and Trademarks